United States Patent
Lane

(10) Patent No.: US 7,569,142 B2
(45) Date of Patent: *Aug. 4, 2009

(54) METHOD AND APPARATUS FOR LIQUID TREATMENT WITH COMBINED ELECTRONIC AND CENTRIFUGAL PROCESSES TO REMOVE CONTAMINANTS

(75) Inventor: John W. Lane, West Hartford, CT (US)

(73) Assignee: Clearwater Systems Corporation, Essex, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/731,126

(22) Filed: Mar. 30, 2007

(65) Prior Publication Data

US 2007/0256967 A1 Nov. 8, 2007

Related U.S. Application Data

(63) Continuation of application No. 10/308,647, filed on Dec. 3, 2002, now Pat. No. 7,217,368.

(60) Provisional application No. 60/340,005, filed on Dec. 10, 2001.

(51) Int. Cl.
  *C02F 1/38* (2006.01)
  *C02F 1/48* (2006.01)
  *C02F 9/00* (2006.01)

(52) U.S. Cl. ............... 210/223; 210/222; 210/243; 210/252; 210/259; 210/294; 210/512.1; 204/660; 204/664

(58) Field of Classification Search ............... 210/222, 210/223, 243, 252, 259, 294, 512.1; 204/660, 204/664

See application file for complete search history.

(56) References Cited

U.S. PATENT DOCUMENTS

| 3,637,134 A | 1/1972 | Nelson |
| 3,954,611 A | 5/1976 | Reedy |
| 4,579,694 A | 4/1986 | Bradley, Jr. |
| 5,114,571 A * | 5/1992 | Pier et al. ............ 210/223 |
| 5,145,585 A | 9/1992 | Coke |
| 5,224,604 A | 7/1993 | Duczmal et al. |
| 5,443,719 A | 8/1995 | Johnson et al. |
| 5,527,426 A | 6/1996 | Marwah et al. |
| 5,540,835 A | 7/1996 | Sanderson |
| 5,635,068 A | 6/1997 | Marandi |
| 5,660,723 A | 8/1997 | Sanderson |
| 5,728,303 A | 3/1998 | Johnson |
| 6,063,267 A | 5/2000 | Crewson et al. |
| 6,355,178 B1 | 3/2002 | Couture et al. |

(Continued)

OTHER PUBLICATIONS

Clearwater Systems LLC website, "Chemical-Free Treatment of Recirculating Water Using Pulsed-Power".

(Continued)

*Primary Examiner*—David A Reifsnyder
(74) *Attorney, Agent, or Firm*—Michaud-Duffy Group LLP

(57) ABSTRACT

An apparatus and method for treating dirty water or other liquids containing particles of varying size includes a magnetic treatment unit and a centrifugal separator through which the liquid flows as a stream in sequence. The magnetic treatment unit causes very small sized particles to agglomerate, nucleate or otherwise to be amassed into larger particles which are then more easily separated by the centrifugal separator.

4 Claims, 1 Drawing Sheet

U.S. PATENT DOCUMENTS 6,743,365 B1    6/2004    Marlowe
6,905,612 B2 *   6/2005    Dorian et al. ............... 210/219

OTHER PUBLICATIONS

Goldsworthy et al., "Biological Effects of Physically Conditioned Water", Biology Dept., Imperial College of Science Technology and Medicine, vol. 33, No. 7,pp. 1618-1626, 1999.

Baker et al., "Magnetic Amelioration of Scale Formation", School of Water Sciences, Cranfield University, vol. 30, No. 2, pp. 247-260, 1996.

Donaldson et al., "Lifting the Scales from our Pipes", New Scientist Feb. 18, 1988.

Lane, John et al., "Condenser Water Treatment Using Pulsed Power," 2003 Cooling Technology Institute Annual Conference, San Antonio, TX.

Matthew J. Vlissides, Request for Inter Partes Reeexamination; Requester's Detailed Statement Pursuant to 37 C.F.R. Sec. 1.915, filed Feb. 18, 2009.

U. S. Department of Energy, Non-Chemical Technologies for Scale and Hardness Control, Federal Technology Alert, Jan. 1998, 32 pages, DOE/EE-0162, Richland, Washington, U.S.A.

* cited by examiner

US 7,569,142 B2

METHOD AND APPARATUS FOR LIQUID TREATMENT WITH COMBINED ELECTRONIC AND CENTRIFUGAL PROCESSES TO REMOVE CONTAMINANTS

CROSS REFERENCE TO RELATED APPLICATION

This application is a continuation of U.S. patent application Ser. No. 10/308,647, filed Dec. 3, 2002, and which issued as U.S. Pat. No. 7,217,368 on May 15, 2007, which is hereby incorporated herein by reference, and which claimed the benefit of U.S. provisional application No. 60/340,005, filed on Dec. 10, 2001, and names as the inventor the same inventor as named in said provisional application, whose invention is claimed in the claims of this application. The benefit of the Dec. 10, 2001 filing date of the provisional application is claimed for this nonprovisional application and the content of said provisional application is hereby incorporated into this application by reference.

FIELD OF THE INVENTION

This invention relates to the treatment of water and other liquids to remove contaminants, and deals with a method and related apparatus whereby electronic and centrifugal treatment processes are combined to enable the efficient removal, among other contaminants, of solids and particulates having a range of sizes which range includes sizes much smaller than those previously removable without exceptional expense and effort.

BACKGROUND OF THE INVENTION

Solids and other harmful contaminants and particulates, including dissolved minerals and organic matter in process water streams have devastating effect on equipments and environment. Present use of water treatment chemicals to maintain contaminants in solution in water have done much damage with substantial side effects. Conventional types of centrifugal separators or hydrocyclones, cannot provide a positive solution in removing micronic pollutants. The water treatment/filtration method and device of this invention have been proven to be "the solution" to these problems. It is well established that the efficiency of centrifugal separators is dependent on the density, size and shape of the particles to be removed, and that under the best conditions the smallness of the particles capable of being removed, at reasonable expense, is limited to about 40 microns. In contrast to this, with the method and apparatus of this invention particles much smaller than 40 microns can be effectively removed. Particles as small as 20 microns have been effectively removed to date, and it is expected that even smaller sizes may be removed in the future.

SUMMARY OF THE INVENTION

The present invention resides in one aspect in an apparatus for liquid treatment, said apparatus comprising a magnetic treatment unit, a centrifugal separator for separating material from a liquid having suspended material, and a flow system. The flow system serves to cause a liquid with said suspended material to flow in a stream passing first through said magnetic treatment unit and then said liquid with all of said suspended material still being in said liquid passing through said centrifugal separator. The magnetic treatment unit selectively subjects said material suspended in said liquid with a high frequency magnetic flux. The flow system comprises a first pipe for conveying water from a source of dirty water to a pump having a controller, a second pipe conveying water from the pump to the treatment unit, a third pipe conveying water from the treatment unit to the separator, and a fourth pipe for conveying clean water from the separator to a clean water delivery station.

BRIEF DESCRIPTION OF THE DRAWINGS

The single FIGURE, FIG. 1, of the drawing shows an apparatus embodying the invention and usable in practicing the method of the invention.

DETAILED DESCRIPTION OF THE INVENTION

Figure 1:
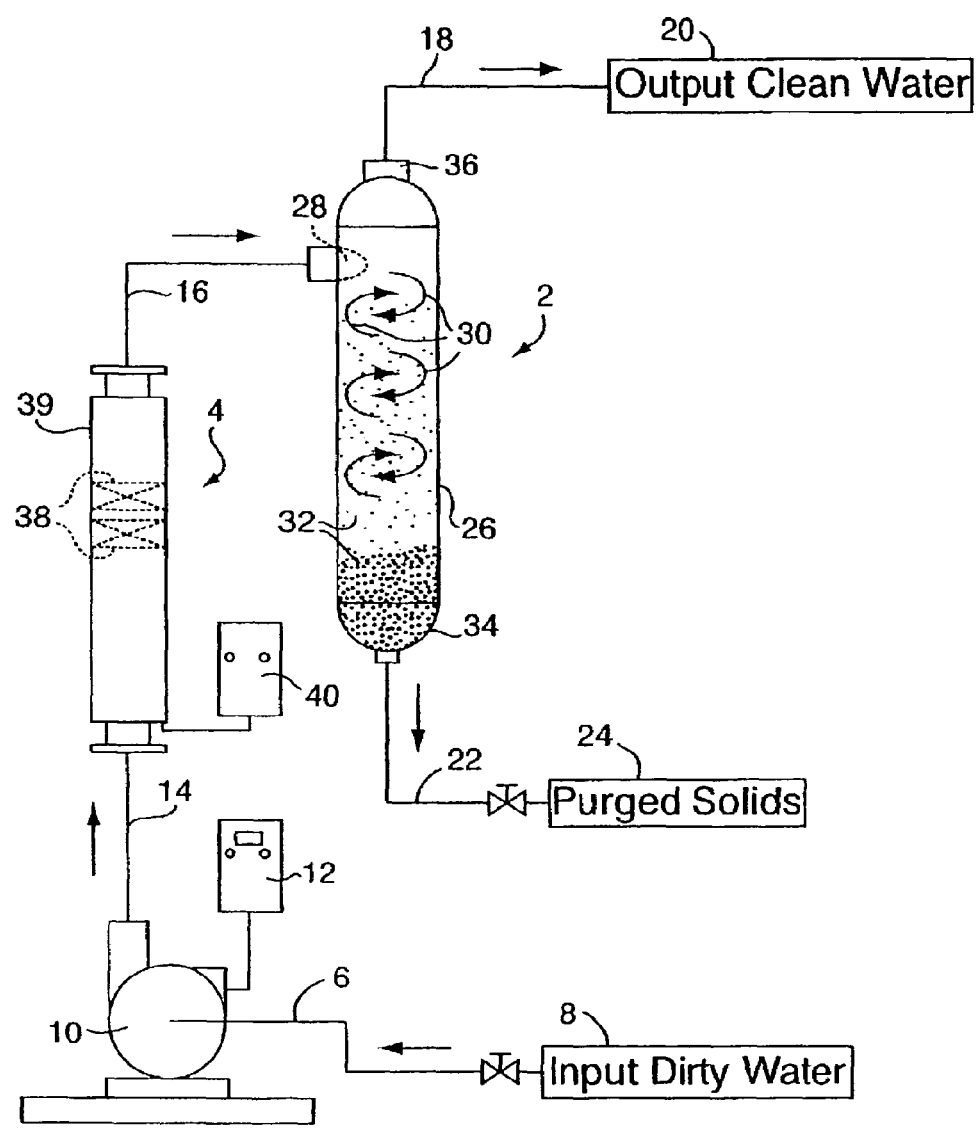

Referring to FIG. 1, the illustrated apparatus, comprising an exemplary embodiment of the invention, includes basically a centrifugal separator 2, a high frequency magnetic flux treatment unit 4, and a flow system for causing impure dirty liquid, which may be and is hereinafter referred to as "water", to pass first through the magnetic flux treatment unit 4 and then through the centrifugal separator 2. In the illustrated case the flow system includes an input pipe 6 for conveying water from a source 8 of dirty water to a pump 10 having a controller 12, a pipe 14 conveying water from the pump 10 to the treatment unit 4, a pipe 16 conveying water from the treatment unit 4 to the separator 2, and an output pipe 18 conveying clean water from the separator 2 to a clean water delivery station 20. A solids purge pipe 22 is also connected to the separator 2 to convey solids removed from the water by the separator 2 to a purged solids delivery station 24.

The centrifugal separator 2 may be any one of known commercially available separators which operate to mechanically separate solids and particles from water flowing through the separator, as by causing the water in the separator to swirl in a circular path centrifugally forcing solids and particles to a radially outward position from which they are separated, collected and purged from the water. Preferably, the separator, as described in more detail hereinafter, is one such as sold by Griswold Separators of 2803 Barranca Parkway, Irvine, Calif. 92606, under model designation CSS (automatic purge) or CSP (closed loop recovery), or one such as shown by U.S. Pat. No. 5,635,068, the disclosure of which is included herein by reference.

The illustrated separator 2 has a generally cylindrical and vertically oriented separator tank 26 to the top of which dirty water is introduced through a tangential opening 28 to cause a swirl or vortex in the tank, as indicated by the arrows 30, forcing solid particles 32 in the water radially outwardly to a region adjacent the vertical cylindrical wall of the tank from which region they fall downwardly to a collection chamber 34 from which they are periodically or continuously purged, with water freed of these particles moving upwardly through an upper outlet 36 of the tank 26 to the output pipe 18.

The treatment unit 4 is one which treats water flowing through it to oscillating magnetic flux created by one or more electrically excited coils 38 through which the dirty water passes and forming part of a pipe unit 39, with the excitation of the coil or coils being controlled by a control unit 40.

The treatment unit 4 is preferably one whereby the oscillating magnetic flux applied to the water is one having a high frequency within the range of 10 kHz to 100 kHz and which appears in time spaced bursts having a burst repetition rate of up to 150 bursts per second. For example the unit 4 may be one as sold by Clearwater Systems, LLC of 145 Dennison Road, P.O. Box 463, Essex, Conn. 06426 under the series name "DOLPHIN", or as shown by U.S. Pat. No. 6,063,267, the disclosure of which is incorporated herein by reference.

Having now described the subject apparatus, its operation may be given as follows.

A stream of water laden with dissolved minerals and solids from condensers, chillers, cooling towers, boilers, heat exchangers, and other sources of used water (e.g. rotating equipment glands or mechanical seals cooling/flushing water, water for distribution spray nozzles for contact cooling and agriculture, etc., is directed to the apparatus from the dirty water supply 8. The pump 10 conveys this stream with positive pressure to the magnetic treatment unit 4 where the surface charges and/or hydration layer on colloidal and/or suspended particles of less than 45 micron size are changed, with the result that these small particles then can and do coagulate into large particles. The stream laden with the coagulated or nucleated particulates and other large particles already in the water upstream of the unit 4, then enters the centrifugal separator 2 through the tangential inlet 28 forcing the solids to move toward the inside surface of the cylindrical wall of the tank 26. The centrifugal force created by the swirling motion of the stream produces a clean vortex in the separator chamber and maintains a helical downwardly moving path of the solids into the collection chamber 34. Solids in this chamber settle calmly until they are purged, manually or automatically, by timer or other means, to the solids delivery station 24.

The water of the clean vortex created in the middle of the separator tank 26 moves upwardly toward and through the outlet 36, from which the outlet pipe 18 conducts it to the clean water delivery station 20 for further use or storage.

The agglomeration and nucleating effect of the magnetic treatment device 4 makes the very small particles of the dirty water into bigger and heavier particles which are easier for the centrifugal separation subsequently carried out by the centrifugal separator 2. The resulting effect is a very clean output water from which solids and particulates of even very small size (e.g., less than 40 microns) have been substantially reduced.

The effectiveness of the method and apparatus of the invention has been proven by tests made to determine the separation effectiveness achieved in handling test samples of dirty water both by a given centrifugal separator alone and by the same centrifugal separator preceded by a magnetic treatment unit in accordance with the invention described above. The results of these tests are given by the following Table 1.

TABLE 1

IMPROVEMENT IN SEPARATION EFFICIENCY COMPARING SEPARATION USING ONLY CENTRIFUGAL SEPARATOR AND SEPARATION USING COMBINATION OF MAGNETIC TREATMENT UNIT AND CENTRIFUGAL SEPARATOR.

| Particle Size Microns | Centrifugal Separator Only Particle Distribution | Combination Particle Distribution | Centrifugal Separator Only Normalized to 100 g Total | Combination Normalized to 69 g >74 micron | Improvement with Combination |
|---|---|---|---|---|---|
| >74 | 69% | 64% | 69% | 69.0 | |
| <74 | 31% | 36% | 31 | 38.8 | 25% |
| <34 | 18% | 26% | 18 | 28.0 | 56% |
| <19 | 8% | 11% | 8 | 11.9 | 48% |
| <9 | 4% | 8% | 4 | 8.6 | 116% |
| <5 | 4% | 6% | 4 | 6.5 | 62% |
| <2 | 3% | 4% | 3 | 4.3 | 44% |
| <1 | 2% | 2% | 2 | 2.2 | 8% |

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. An apparatus for liquid treatment, said apparatus comprising:
   a magnetic treatment unit;
   a centrifugal separator for separating material from a liquid having suspended material; and
   a flow system for causing a liquid with said suspended material to flow in a stream passing first through said magnetic treatment unit and then said liquid with all of said suspended material still being in said liquid passing through said centrifugal separator; and wherein
   said magnetic treatment unit includes a coil unit to electrically excite at least one coil surrounding said stream for creating a high frequency magnetic flux which selectively subjects said material suspended in said liquid with a high frequency magnetic flux having a frequency range of 10 kHz to 100 kHz, said high frequency magnetic flux changes surface conditions of said material suspended in said liquid such that said material adheres to form agglomerations of coagulated particles which are then separated from said liquid in said centrifugal separator;
   wherein said flow system comprises a first pipe conveying water from a source of dirty water to a pump having a controller, a second pipe conveying water from the pump to the magnetic treatment unit, a third pipe conveying water from the magnetic treatment unit directly to the centrifugal separator, and a fourth pipe conveying clean water from the centrifugal separator to a clean water delivery station.

2. An apparatus for liquid treatment as defined in claim 1 wherein: said control unit excites at least one coil to be such that said high frequency magnetic flux appears in time spaced bursts having a burst repetition rate of up to 150 bursts per second.

3. An apparatus for liquid treatment as defined in claim 1, wherein: said centrifugal separator is one wherein said liquid of said stream is caused to flow in a circular path to produce a centrifugal force urging particles in said liquid to move radially outwardly to a radially outer region.

4. An apparatus for liquid treatment as defined in claim 3, wherein: said centrifugal separator includes a vertically oriented cylindrical tank to an upper end of which the liquid stream is introduced through a tangential inlet opening in the tank, the tank having an outlet opening above the tangential inlet opening through which cleaned liquid is removed from the tank, and the tank further having a bottom end spaced below said tangential inlet opening and forming a chamber for collecting particles separated from the liquid of the introduced stream.

* * * * *